US008342927B2

(12) United States Patent
Englman et al.

(10) Patent No.: US 8,342,927 B2
(45) Date of Patent: Jan. 1, 2013

(54) COMMUNITY GAMING SYSTEM WITH HYBRID COMMUNITY AND INDIVIDUAL OUTCOMES AND AWARDS

(75) Inventors: Allon G. Englman, Chicago, IL (US); Peter W. Flemming, Oak Park, IL (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 477 days.

(21) Appl. No.: 12/596,938

(22) PCT Filed: Apr. 18, 2008

(86) PCT No.: PCT/US2008/005032

§ 371 (c)(1),
(2), (4) Date: Oct. 21, 2009

(87) PCT Pub. No.: WO2008/133850

PCT Pub. Date: Nov. 6, 2008

(65) Prior Publication Data

US 2010/0137047 A1 Jun. 3, 2010

Related U.S. Application Data

(60) Provisional application No. 61/001,508, filed on Nov. 1, 2007, provisional application No. 60/926,481, filed on Apr. 27, 2007.

(51) Int. Cl.
*A63F 13/00* (2006.01)

(52) U.S. Cl. ............................................ 463/6; 463/20

(58) Field of Classification Search .................... 463/16, 463/6, 20

See application file for complete search history.

(56) References Cited

U.S. PATENT DOCUMENTS 5,544,892 A 8/1996 Breeding
5,842,698 A 12/1998 Brown
5,851,011 A 12/1998 Lott
5,997,400 A 12/1999 Seelig et al.
(Continued)

FOREIGN PATENT DOCUMENTS

EP 1 513 114 A2 3/2005
(Continued)

OTHER PUBLICATIONS

Written Opinion corresponding to co-pending International Patent Application Serial No. PCT/US2008/005032, European Patent Office; dated Aug. 11, 2008; 6 pages.

(Continued)

*Primary Examiner* — Arthur O. Hall
*Assistant Examiner* — Jeffrey Wong
(74) *Attorney, Agent, or Firm* — Nixon Peabody LLP

(57) ABSTRACT

A method for conducting a community wagering game on one or more gaming devices comprises receiving a first wager from a first player and determining a first modifier associated with the first player based upon play of a first base game. The method further comprises triggering and displaying a community gaming event comprising a competition and determining a finishing order of a plurality of participants in the competition, the plurality of participants including at least first and second participants. The method further comprises associating the first player with the first participant, determining a first prize value for the first participant, the first prize value based upon the finishing order, and awarding the first player a first award comprising the first prize value as modified by the first modifier.

21 Claims, 16 Drawing Sheets

U.S. PATENT DOCUMENTS

| | | | | |
|---|---|---|---|---|
| 6,164,651 | A | 12/2000 | Webb | |
| 6,517,073 | B1 | 2/2003 | Vancura | |
| 6,523,124 | B1 | 2/2003 | Lunsford et al. | |
| 6,755,741 | B1 | 6/2004 | Rafaeli | |
| 7,169,041 | B2 | 1/2007 | Tessmer et al. | |
| 7,311,604 | B2 | 12/2007 | Kaminkow et al. | |
| 7,448,949 | B2 | 11/2008 | Kaminkow et al. | |
| 7,662,040 | B2 | 2/2010 | Englman et al. | |
| 7,666,092 | B2 | 2/2010 | Kaminkow et al. | |
| 7,780,531 | B2 | 8/2010 | Englman et al. | |
| 7,854,654 | B2 | 12/2010 | Baerlocher et al. | |
| 7,892,093 | B2 | 2/2011 | Kniesteadt et al. | |
| 7,931,530 | B2 | 4/2011 | Anderson et al. | |
| 7,963,847 | B2 | 6/2011 | Baerlocher | |
| 2002/0006822 | A1 | 1/2002 | Krintzman | |
| 2002/0163778 | A1 | 11/2002 | Hazzard et al. | |
| 2002/0183105 | A1 | 12/2002 | Cannon et al. | |
| 2003/0050106 | A1 | 3/2003 | Lyfoung | |
| 2003/0064805 | A1 | 4/2003 | Wells | |
| 2003/0114220 | A1 | 6/2003 | McClintic | |
| 2003/0119581 | A1 | 6/2003 | Cannon et al. | |
| 2003/0148807 | A1 | 8/2003 | Acres | |
| 2004/0102243 | A1 | 5/2004 | Olsen | |
| 2005/0020340 | A1 | 1/2005 | Cannon | |
| 2005/0192086 | A1* | 9/2005 | Walker et al. | 463/20 |
| 2006/0019744 | A1 | 1/2006 | Roemer | |
| 2006/0040732 | A1 | 2/2006 | Baerlocher et al. | |
| 2006/0121971 | A1* | 6/2006 | Slomiany et al. | 463/16 |
| 2006/0135243 | A1 | 6/2006 | Englman et al. | |
| 2006/0223611 | A1 | 10/2006 | Baerlocher et al. | |
| 2008/0020847 | A1 | 1/2008 | Kniesteadt et al. | |
| 2008/0045341 | A1 | 2/2008 | Englman | |
| 2008/0070702 | A1 | 3/2008 | Kaminkow et al. | |
| 2008/0081690 | A1 | 4/2008 | Baerlocher et al. | |
| 2008/0113771 | A1 | 5/2008 | Baerlocher et al. | |
| 2008/0139290 | A1 | 6/2008 | Kniesteadt et al. | |
| 2008/0153564 | A1 | 6/2008 | Baerlocher et al. | |
| 2010/0291991 | A1 | 11/2010 | Baerlocher et al. | |

FOREIGN PATENT DOCUMENTS

| | | | |
|---|---|---|---|
| EP | 1 564 698 | A2 | 8/2005 |
| EP | 1 762 990 | A2 | 3/2007 |
| WO | WO 2006/015442 | A1 | 2/2006 |

OTHER PUBLICATIONS

International Search Report corresponding to co-pending International Patent Application Serial No. PCT/US2008/005032, European Patent Office; dated Aug. 11, 2008; 4 pages.

* cited by examiner

COMMUNITY GAMING SYSTEM WITH HYBRID COMMUNITY AND INDIVIDUAL OUTCOMES AND AWARDS

CROSS REFERENCE TO RELATED APPLICATIONS

This application is a U.S. national stage filing of International Application No. PCT/US2008/005032, filed Apr. 18, 2008, which is related to and claims priority from U.S. Provisional Application No. 60/926,481, filed Apr. 27, 2007, and U.S. Provisional Application No. 61/001,508, filed Nov. 1, 2007, all of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a community gaming system having hybrid community and individual outcomes and awards.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a “secondary” or “bonus” game that may be played in conjunction with a “basic” game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with “progressive jackpot” awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, gaming machines provide players with individual awards and prizes with limited communal or community gaming features. Bonus games provide additional enjoyment and entertainment, but ultimately still provide players with individual awards upon conclusion. One problem with such an award scheme is that the player’s enjoyment, excitement, and incentive to continue playing the gaming machine is limited due to the individual nature of the game. Another problem is that player socialization, camaraderie, and interaction is limited by individual gaming events. Yet another problem is that higher wagering players are hesitant to participate in community events with lower wagering players due to a perceived inequity. The present invention is directed to solving these and other problems.

SUMMARY OF THE INVENTION

According to one aspect of the present invention, a method for conducting a community wagering game on one or more gaming devices comprises receiving a first wager from a first player and determining a first modifier associated with the first player based upon play of a first base game. The method further comprises triggering and displaying a community gaming event comprising a competition and determining a finishing order of a plurality of participants in the competition, the plurality of participants including at least first and second participants. The method further comprises associating the first player with the first participant, determining a first prize value for the first participant, the first prize value based upon the finishing order, and awarding the first player a first award comprising the first prize value as modified by the first modifier.

According to another aspect of the invention, a community gaming system comprises a wager input device and a first display for displaying a first randomly selected outcome of a first community wagering game, the first randomly selected outcome comprising a community portion and a first individual portion. The system further comprises a community controller operative to determine the community portion. The system further comprises a first controller operative to (i) determine the first individual portion of the first randomly selected outcome, (ii) cause the first display to display the first randomly selected outcome, and (iii) award a prize if the first randomly selected outcome comprises a winning outcome.

According to yet another aspect of the invention, a community gaming system comprises a wager input device and at least one display for displaying a plurality of community wagering games, the plurality of community wagering games including a first community wagering game and a second community wagering game. The first community wagering game comprises presentation of a plurality of first outcomes, each first outcome having a community portion and an individual portion. The second community wagering game comprises presentation of a plurality of second outcomes, each second outcome comprising a community outcome. The system further comprises a community controller operative to (i) in response to the occurrence of a triggering event, select which of the plurality of community wagering games to display, (ii) in response to the first community wagering game being selected, determine the community portion of the first community wagering game, and (iii) in response to the second community wagering game being selected, determine a randomly selected second outcome. The system further comprises a first controller operative, in response to the first community wagering game being selected, to (i) determine the individual portion of the first outcome, (ii) cause the at least one display to display the first outcome, and (iii) award a prize if the first outcome comprises a winning outcome.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
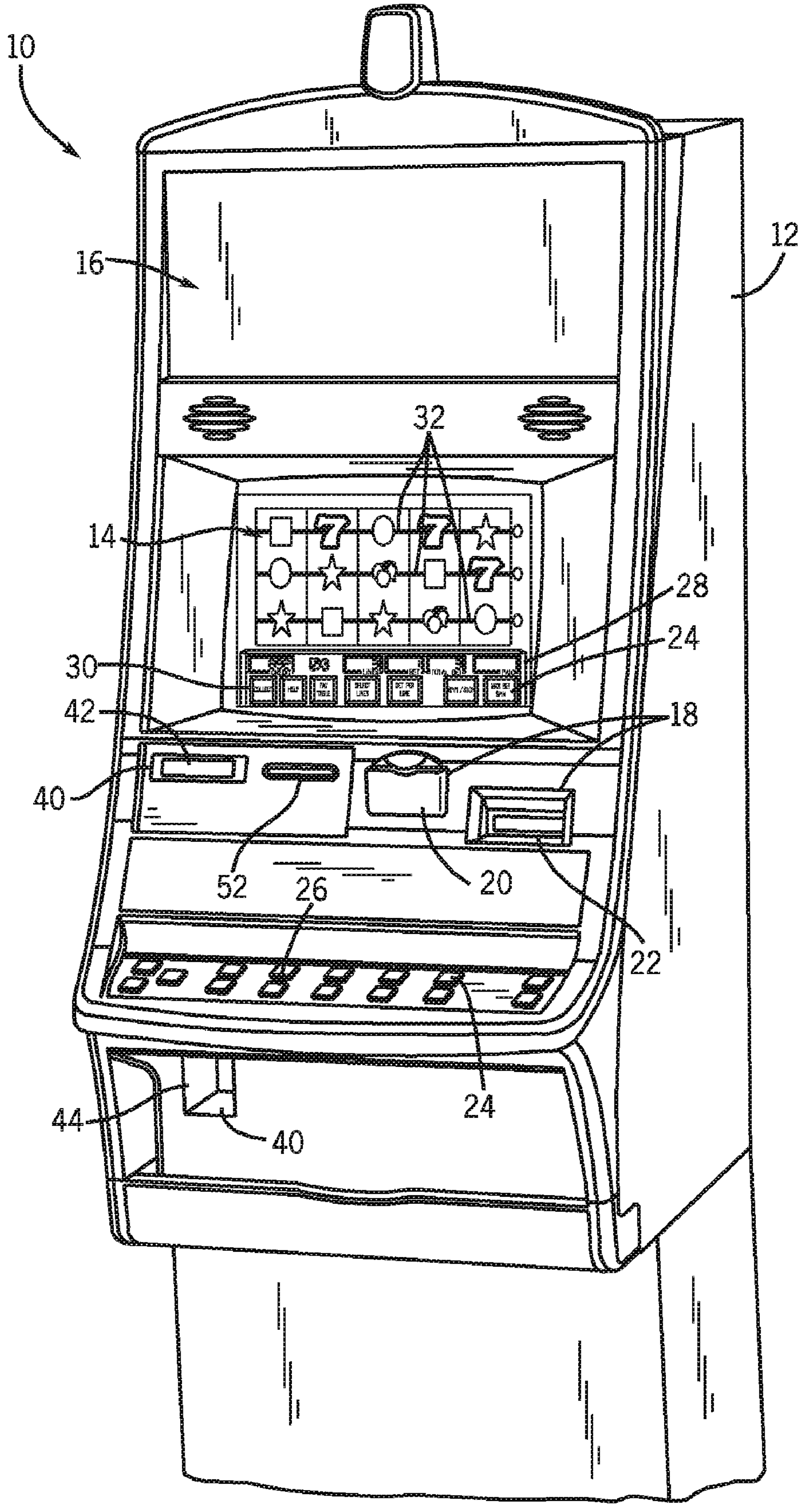
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
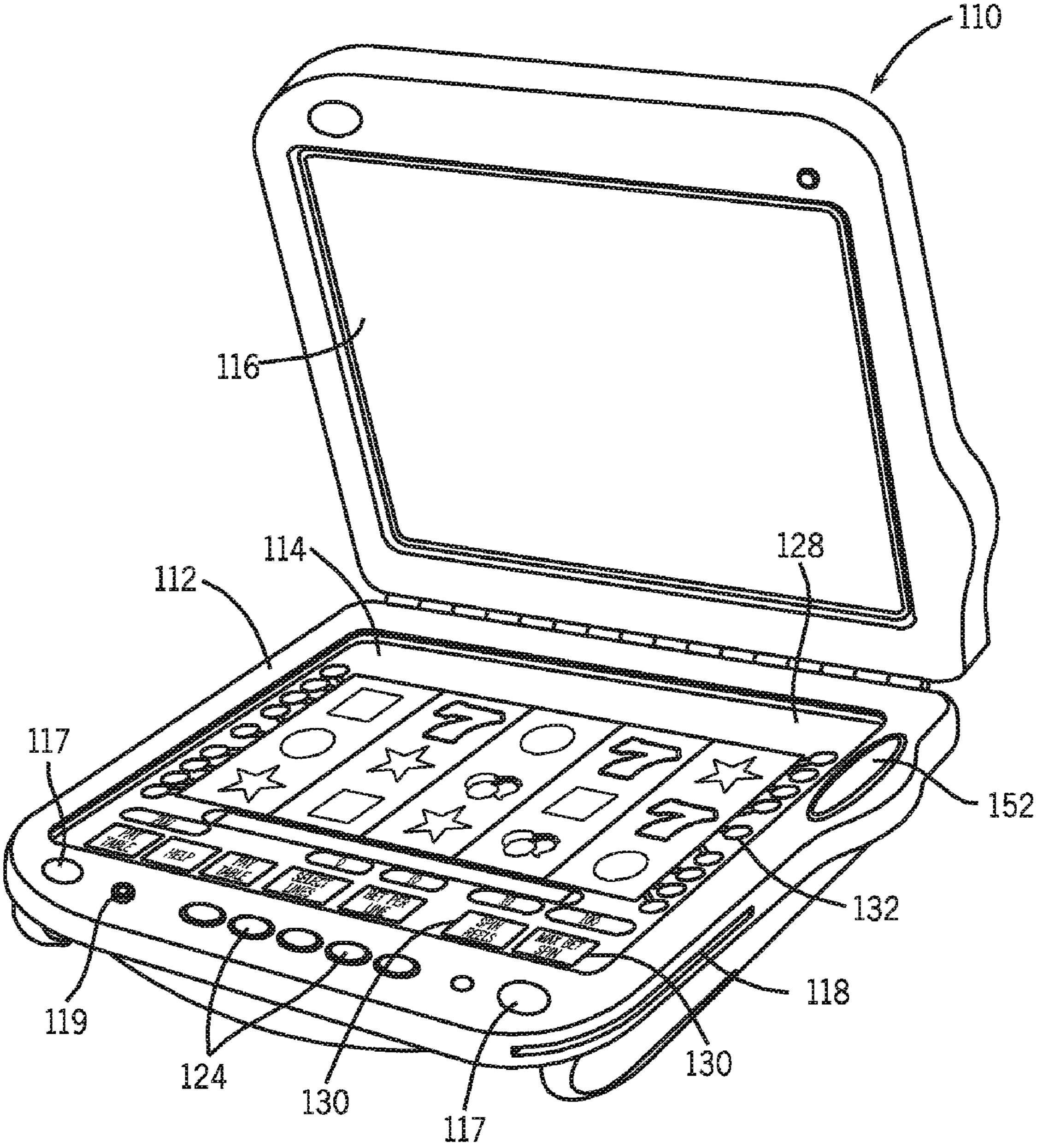
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
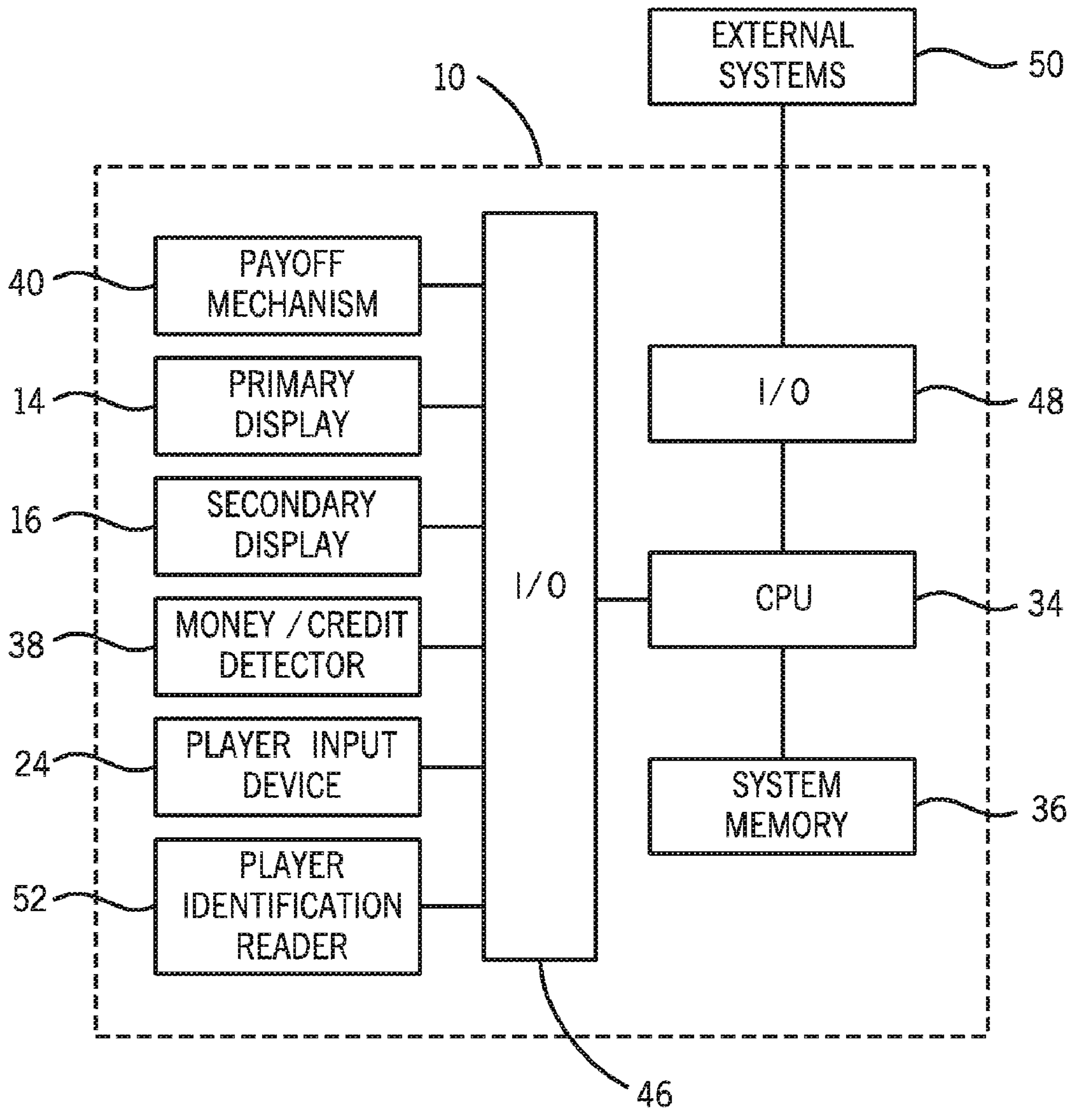
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

In addition to the player input devices 24, 124 described herein with reference to FIGS. 1*a* and 1*b*, in alternative embodiments, the player input devices 24,124 may comprise on or more mind control input devices 25 placed in communication with the controller 34. The mind control input device 25 may comprise a helmet, hat, or other head worn device which includes a plurality of electrodes which measure electrical activity of the brain of a player. The received signals from the electrodes are translated into input commands which are used as player inputs into the gaming device. In one embodiment, the detection, receipt of, and translation of mental commands via the mind control input device 25 are electroencephalographic, or EEG technology. The mind control input device 25 permits players' thoughts to be translated into player inputs into the gaming device. Moreover, through monitoring of brain waves via the mind control input device 25, can determine and utilize as inputs player's expressions, emotions, and thoughts. One such mind control input device 25 is the Project Epoc helmet manufactured and distributed by Emotiv Systems, Inc. of San Francisco, Calif.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
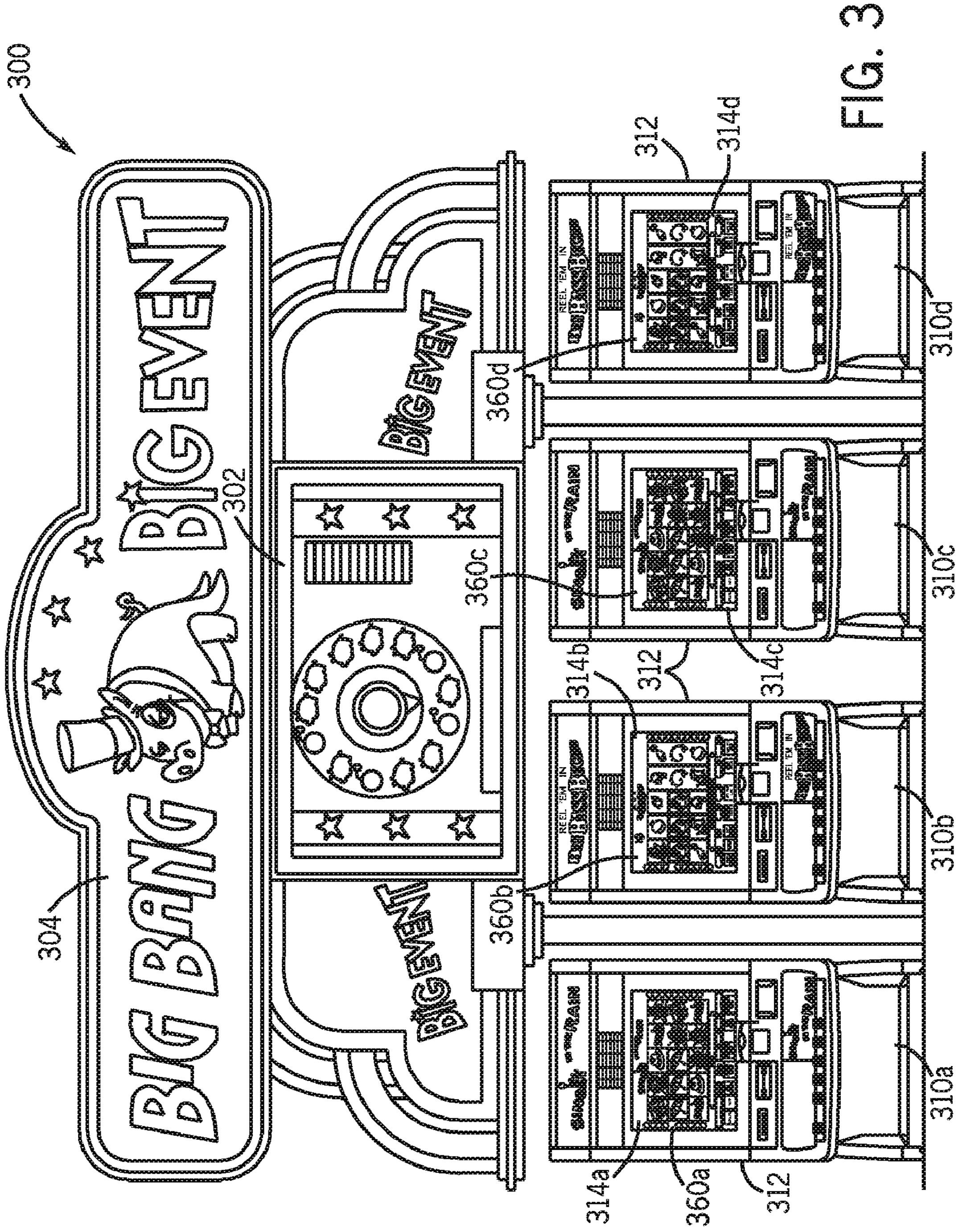
FIG. 3 is a gaming system including a community wagering game in accordance with the present invention.

Turning now to FIG. 3, a gaming system 300 comprising a plurality of gaming machines 310*a,b,c,d*. Each gaming machine 310*a,b,c,d* includes a primary display 314*a,b,c,d* supported by the housing 312 of such gaming machine 310. The gaming machines 310*a,b,c,d* may be either free standing gaming machines (as shown in FIG. 3 and described herein with reference to FIG. 1*a*), handheld gaming machines (not shown) such as those in FIG. 1*b*, or any combination of the two. The primary displays 314*a,b,c,d* of each gaming machine 310*a,b,c,d* display wagering games 360*a,b,c,d*. The various displays 314*a,b,c,d* may display the same wagering game or each may display a different wagering game 360*a, b,c,d* as seen in FIG. 3. In this embodiment, the various wagering games 360*a,b,c,d* are slot games. The system 300 further includes a community display 302 which is mounted or supported above the plurality of gaming machines 310*a,b, c,d*. The community display 302 comprises a secondary video display such as a plasma, LED, LCD, or other display. Information relevant to community wagering games, or portions thereof, is displayed on the community display 302 so that it is visible by players of the gaming machines 310*a,b,c,d*. The community wagering game may be one of any number of bonus games, group games, competition games, etc. and may involve interaction, competition, collaboration or common outcomes for a plurality of players of the gaming machines 310*a,b,c,d*. The system 300 may further include signage 304 which comprises other labels, signs, indicators, or marking relating to advertising, promotions, or a theme of one or more of the gaming machines 310*a,b,c,d* or one or more community wagering games. In the embodiment shown, the signage 304 is entitled "Big Bang Big Event" and is related to a theme of one or more community wagering games displayed on the community display 302.

Figure 4:
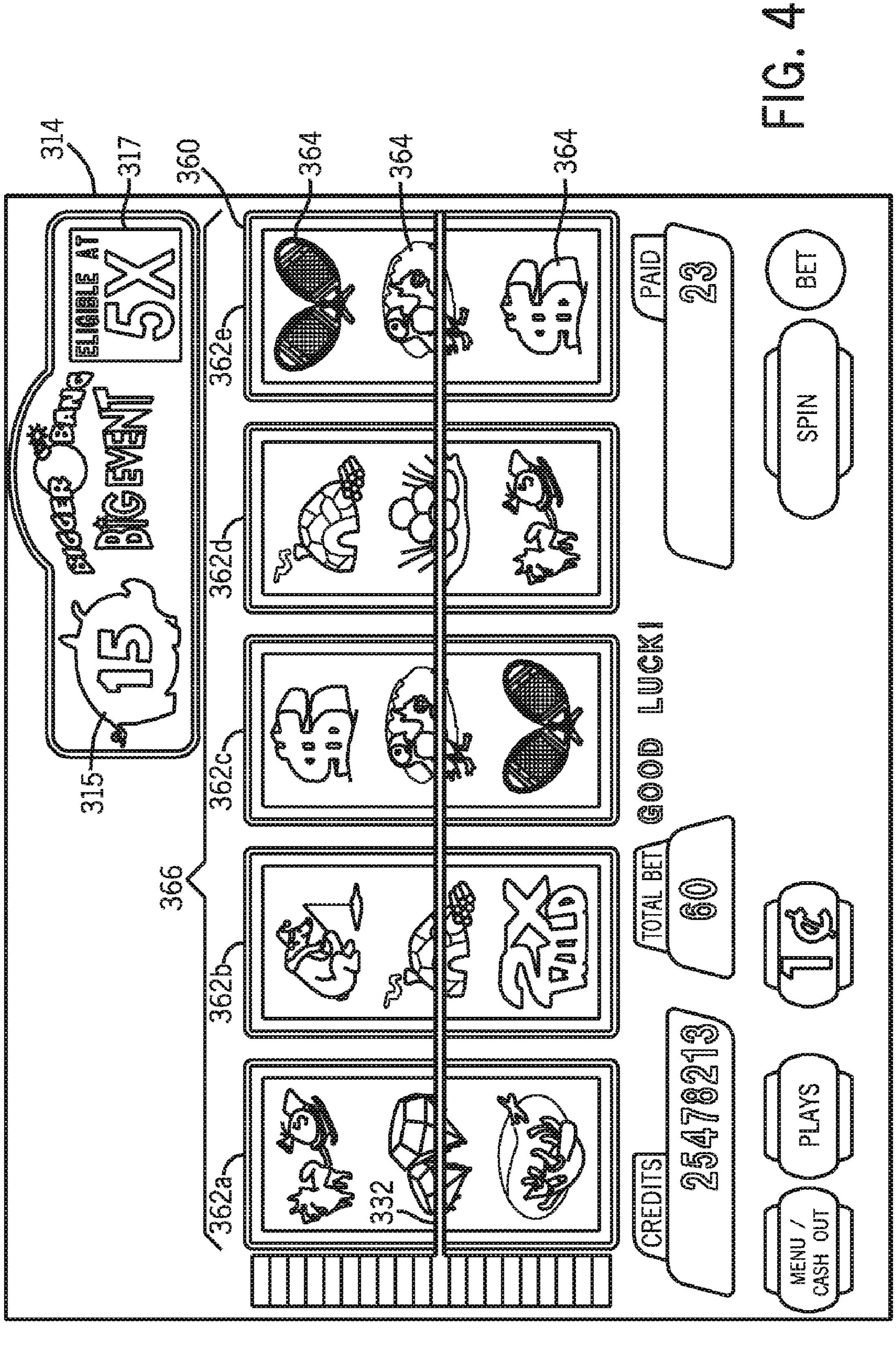
FIG. 4 is a screen shot of a gaming machine of the gaming system of FIG. 3.

In FIG. 4, a primary display 314 of one of the gaming machines 310 of the system 300 is shown. The primary display 314 displays a primary wagering game 360 which includes a plurality of reels 362*a,b,c,d,e* which may be either electro mechanical reels or simulations thereof on the primary display 314. The reels 362*a,b,c,d,e* include a plurality of symbols 364 displayed thereon which vary as the reels 362*a, b,c,d,e* are spun and stopped. The symbols 364 may include any variety of graphical symbols, elements, or representations, including symbols 364 which are associated with one or more themes of the gaming machines 310. The symbols 364 may also include a blank symbol, or empty space. As described herein the symbols 364 landing on the active paylines 332 (the paylines for which a wager has been received) are evaluated for winning combinations. If a winning combination of symbols 364 lands on an active payline 332, a primary award is awarded in accordance with a paytable of the gaming device. The symbols 364 on the reels 362*a,b,c,d,e* form a matrix 366 of symbols 364, having a number of rows and columns. In alternate embodiments, the matrix 366 may have greater or fewer symbols 364, and may take on a variety of different forms having greater or fewer rows and/or columns. The matrixes 366 may even comprise other non-rectangular forms or arrangements of symbols 364.

During play of the primary wagering game 360, certain triggering events may trigger one or more community wagering games. The triggering events may be certain outcomes occurring on one or more of the gaming machines 310 of the system 300. For example, certain symbol combinations may trigger a community wagering game. Other triggers may include randomly executed community wagering games, based upon size or number of wagers, time playing the primary wagering game 360 ("time on device"). Upon the occurrence of one or more of triggering events, a community wagering game is displayed, as described herein. In an embodiment, only eligible players participate in the displayed community wagering game. Such eligibility can be based on a number of factors. For example, only players wagering a certain amount, or having certain time on device, or reaching certain levels or episodes of the primary wagering game 360 may be eligible to participate in the community wagering game, when triggered. Other eligibility criteria may include total coin in on device, achieving certain outcomes in the primary wagering game 360, collection of certain assets, player reward accumulation and award level, etc. In one embodiment, eligibility may be time based eligibility, as described in PCT Patent Application WO 2006/121663 to Anderson, entitled "Wagering Game with Time-Based Bonus" and assigned to WMS Gaming Inc., which is hereby incorporated fully by reference as if fully set forth herein. Moreover, the gaming system 300 may include play of a plurality of community wagering games, and may select one or more of those community wagering games to execute, and thereby permit play by one or more eligible players at the various gaming devices of the system 300, as described in published US Patent Applications 2005/0003886, 2006/0009283, 2006/0135243 to Englman et al, assigned to WMS Gaming Inc., which are hereby incorporated fully by reference as if fully set forth herein In FIG. 4, the time-based eligibility of a player of the primary wagering game 360 is shown on the primary display 314. The display 314 includes an eligibility meter 315 which includes a modifier 317, which in this embodiment is a multiplier level, shown as "8×". The multiplier level 317 is based upon the amount of wager and rate of play, as described in the referenced PCT Patent Application to Anderson. The eligibility meter 315 decrements over time, but is replenished and increased based upon further plays of the primary wagering game 360. In such an embodiment, a community wagering game is triggered at random time intervals selected by the operator of the casino or gaming system 300. Once triggered, all eligible players participate in the community wagering game as described herein. In participating, each eligible player retains their modifier 317, in this case a multiplier level, from the time the community wagering game was triggered. Other modifiers 317 may be used instead of, or in addition to, a multiplier, and may include additional credit amounts, additional entries in the community wagering game, etc. In the embodiment shown, the eligibility meter 317 shows that the player has fifteen (15) seconds of remaining eligibility. If a community wagering game is triggered within that time frame, the player will be permitted to participate.

Figure 5:
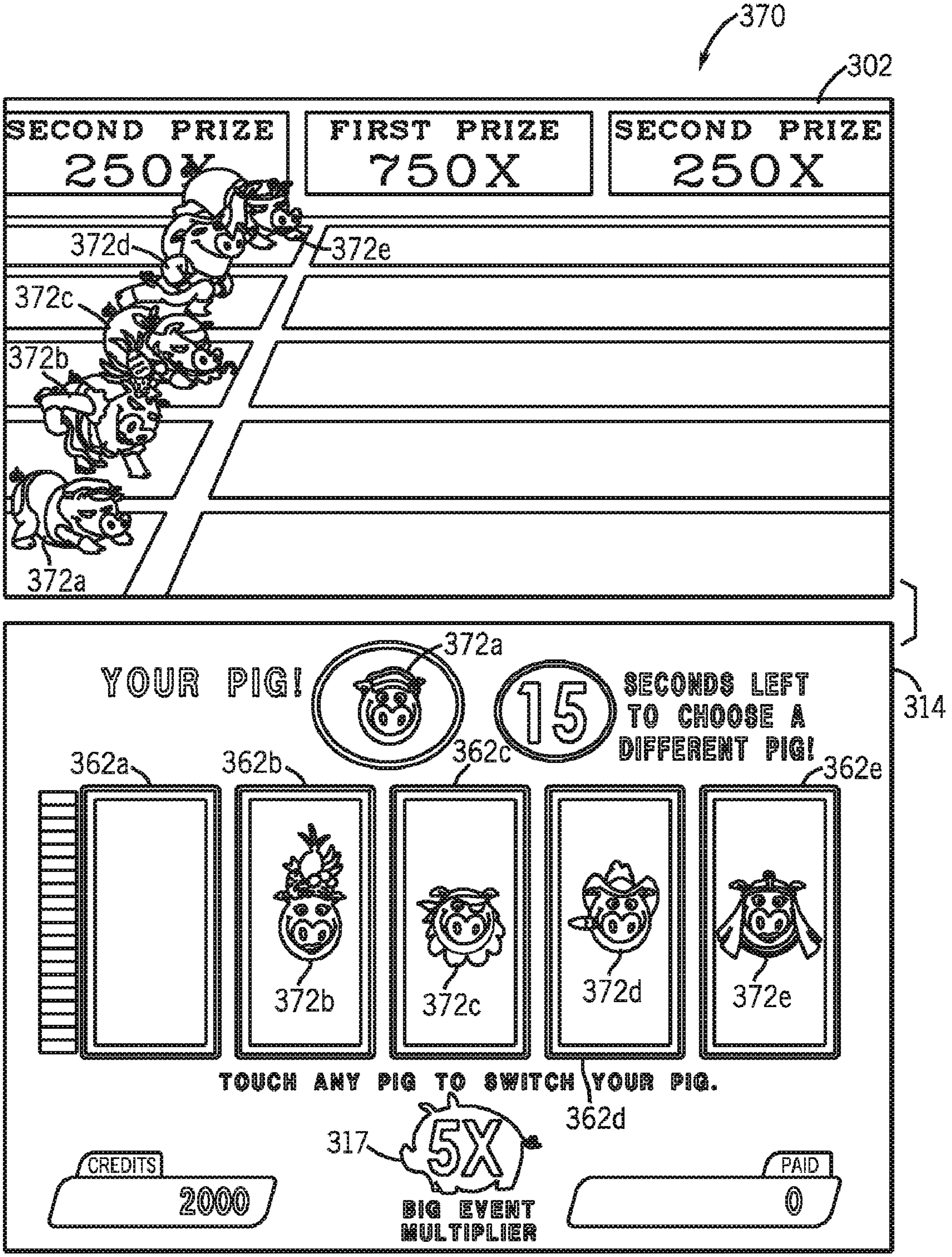
FIG. 5 is a screen shot of a community display and a primary display depicting an embodiment of a community wagering game.

Turning to FIG. 5, a community wagering game 370 known as the "Pig Race Bonus" is shown displayed in part on the community display 302 of the gaming system 300, and in part on the primary display 314 of one of the gaming machines 310 in the system 300. The community display 302 depicts a first portion of the community wagering game 370 in which a plurality of participants 372 are shown participating in a competition. In this embodiment the competition is a race amongst the participants 372. In other embodiments other competitions may be used during display of the community wagering game 370, including sporting competitions, trivia contests, and other events in which the participants finish or place in an order or ranking, as described herein. The participants 372 are shown as graphical icons related to a theme of the community wagering game. In the embodiment shown, the participants 372 are displayed as a variety of "Pigs", as these icons are related to the Big Bang Big Event theme of the community wagering game as shown in FIG. 3.

A second portion of the community wagering game 370 is shown on the primary display 314. The primary display 314 depicts the plurality of participants 372 in the race, and prompts the player to select a participant 372 to represent the player in the community wagering game 370. In this embodiment, the participants 372 are displayed at the location of the reels 362 on the primary display 314 so as to receive the player selection via a touch screen overlaying the primary display 314. However, the player's selection of participants 372 may be received via other player input devices as described herein. In FIG. 5, the player has selected the "Biker Pig" participant 372*a* from the first reel 362*a*. The selection is depicted at the top of the primary display 314, which reads "Your Pig!" and shows the "Biker Pig" participant 372*a* icon, which is a pig wearing a leather hat. The primary display 314 also displays the players modifier 317, a "5×" multiplier, which has been carried over from play of the primary wagering game. All of the participants 372 are shown both as selectable elements on the primary display 314 as well as preparing to participate in the race on the community display 302. In an embodiment, only one player can select a particular participant 372, and upon being selected, that participant 372 is no longer available for selection by other players. In an alternative embodiment, multiple players can select the same participant 372.

Moreover, in yet other alternative embodiments, player selection of their participant 372 may be accomplished in many other ways, including outside of the presentation of the community wagering game 360 as shown herein. For example, the player's participant 372 character may be constantly shown as informational text on a portion of the display 314. In such an embodiment, the player is able to change his participant 372 icon at any time, even during play of a basic wagering game and prior to or after execution of the relevant community wagering game 360. The player's selected icon remains on the display 314 to inform the player as to who his or her participant 372 will be should the community wagering game 360 be triggered. This speeds up play of the community wagering game 360 by obviating the need for players to choose their participants 372 as part of the game 360 itself. In yet another embodiment, the players may be randomly assigned participants 372, rather than selecting the participants 372 themselves. Moreover, the players may be assigned participants 372 in accordance with some algorithm, formula, or scheme.

Figure 6:
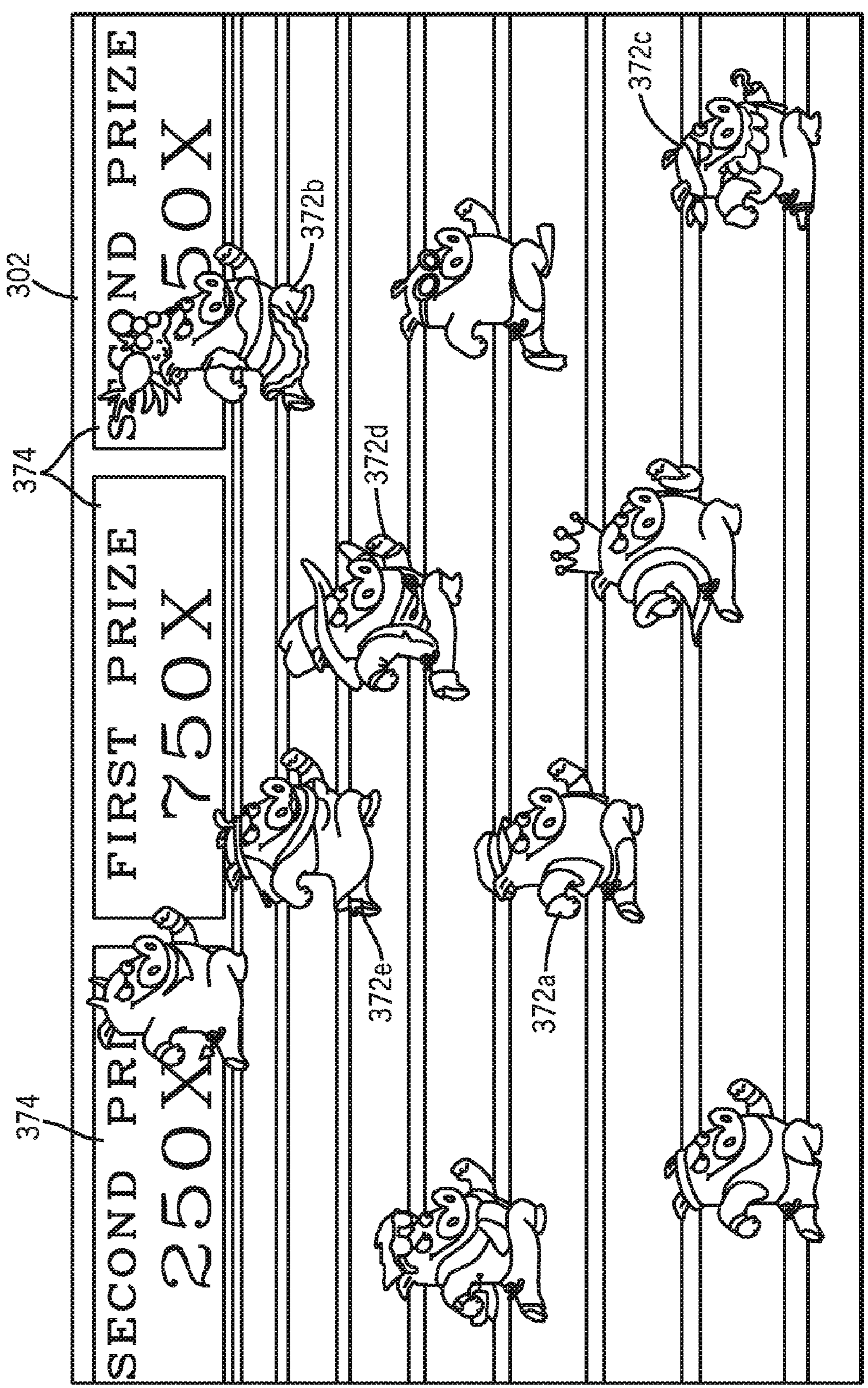
FIG. 6 is a screen shot of a community display depicting another portion of the community wagering game of FIG. 5.
Figure 7:
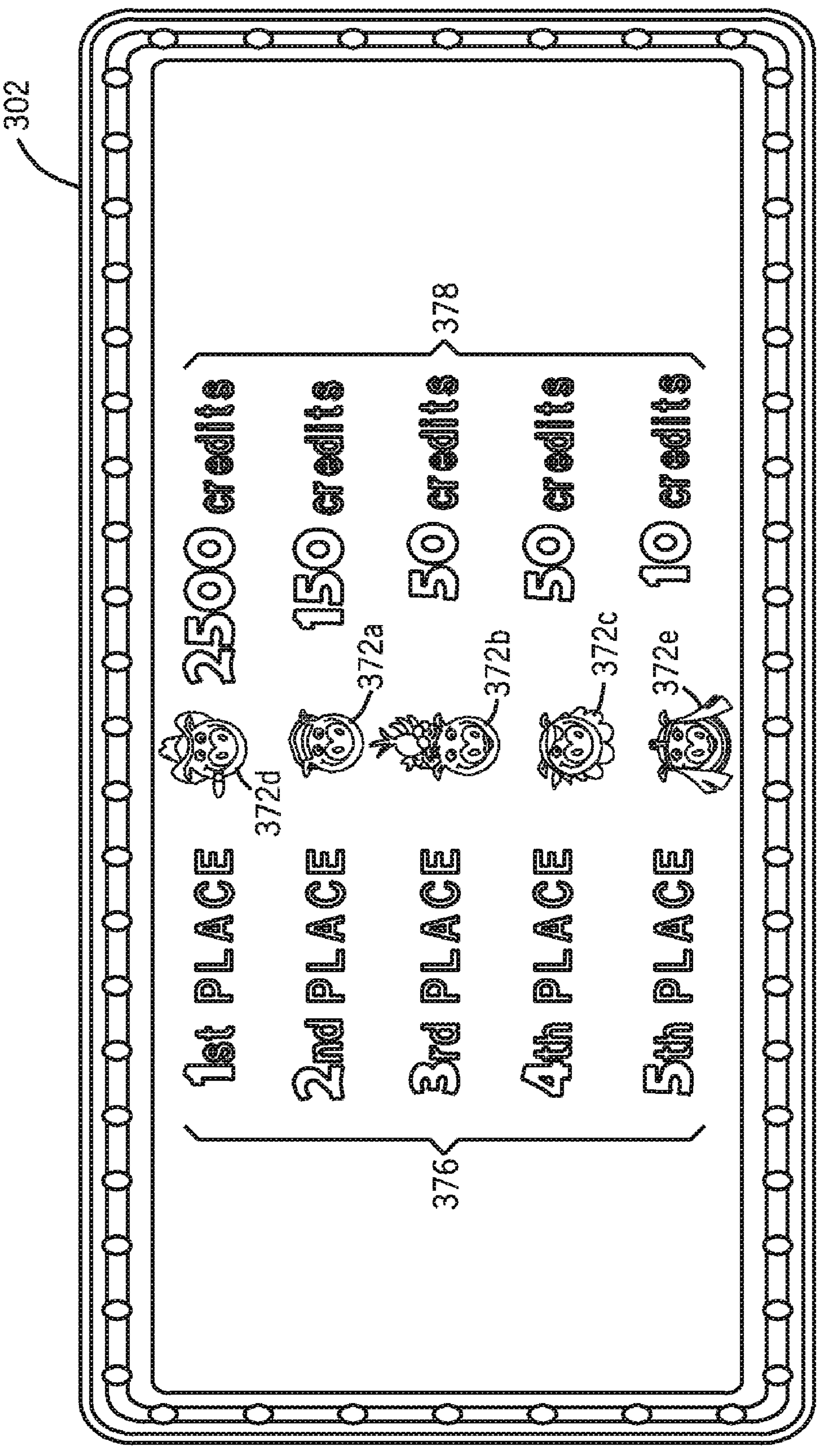
FIG. 7 is a screen shot of a finishing order and pay table of a community wagering game.

Turning to FIG. 6, once the eligible players have selected their respective participants 372, the race is displayed on the community display 302. The race includes animations of the various participants 372 competing against one another and may further include prize information 374, as seen in FIG. 6. The competition is shown in an animated manner so as to induce excitement and interest for the players who are participating in the community wagering game 370. The race or competition concludes in the participants 372 crossing a finish line and establishing a finishing order 376 in the competition, as shown in pay table 378 of FIG. 7. The finishing order 376 corresponds to the ranking or order of participants 372 competing in the race competition. The pay table 378 of FIG. 7 may be displayed on the community display 302, the primary display 314 of the various gaming machines 310, or both. The pay table 378 includes a plurality of community prizes, awards, or payoffs corresponding to the finishing order 376 in the competition. In the embodiment shown, the "Biker Pig" participant 372*a* finished in second place in the finishing order 376, and thus received a community award of 150 credits. Therefore all players participating in the community wagering game 370 who selected the "Biker Pig" contestant 372*a* are awarded the community award of 150 credits.

In an embodiment, the total award each player receives is the community award of 150 credits as modified by the player's modifier obtained during play of the primary wagering game 360. Thus in this example, the players modifier was a multiplier of "5×" obtained during play of the primary wagering game 360 prior to triggering of the community wagering game 370. As such, the player's total award is the community award of 150 credits modified by the 5× multiplier (multiplied by 5), for a total of 750 credits. Therefore, it can be seen that the various eligible players participating in the community wagering game 370 enter the game 370 with differing modifiers (based upon their individual play of the primary wagering game 360) and make independent selections of participants 372 in the community wagering game 370. Thus, players having different modifiers and selecting the same participant will receive different total awards. Moreover, a player having a larger modifier but selecting a participant 372 finishing lower in the finishing order 376 may still receive a larger total award than a player having a relatively lower modifier and selecting a participant 372 finishing higher in the finishing order 376. In this way, a player's total award is based upon both an individual component (the player's modifier) and a community component (the finishing order 376 of the player's selected participant 372).

Figure 8:
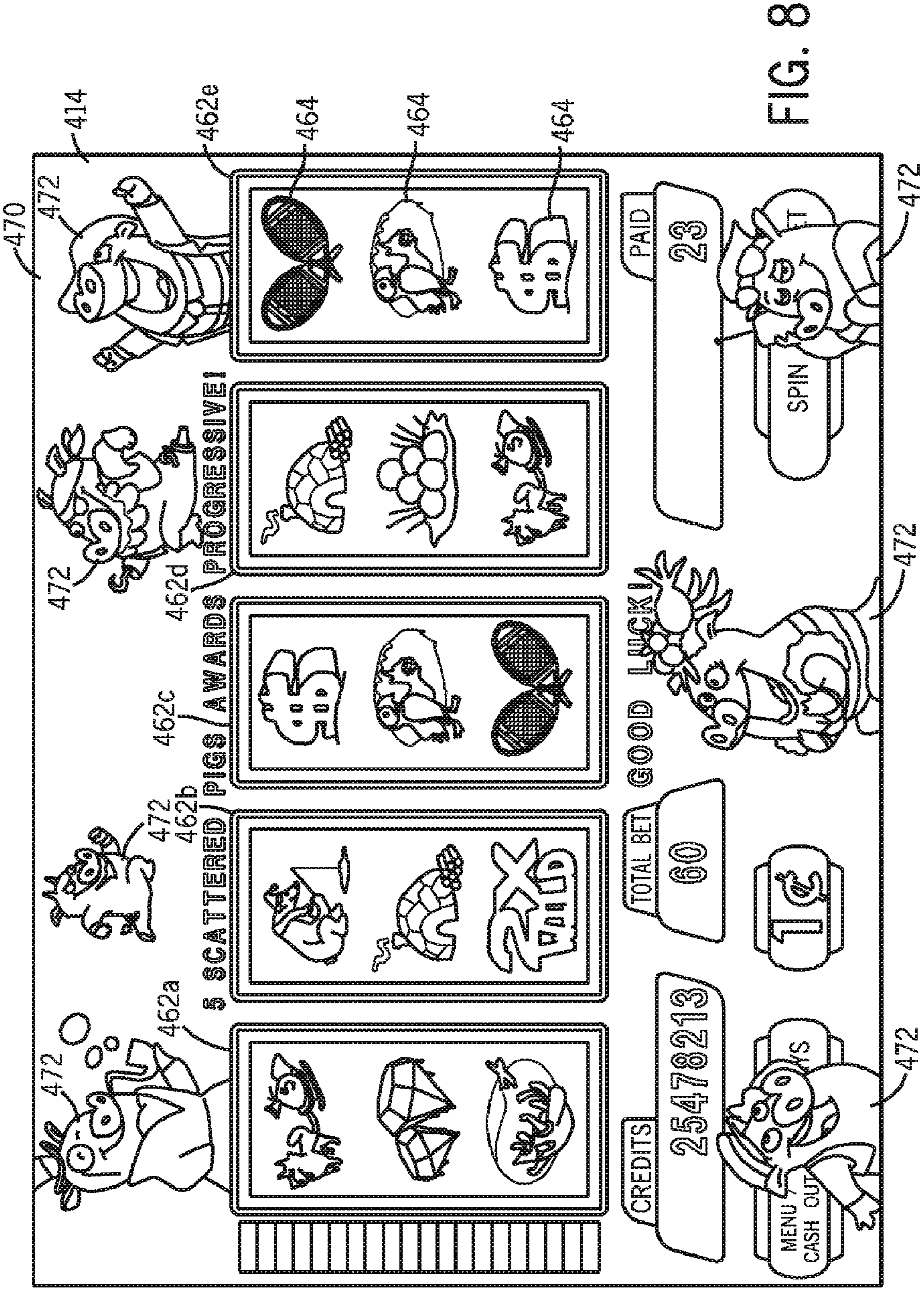
FIG. 8 is a screen shot depicting an alternative embodiment of a community wagering game.
Figure 9:
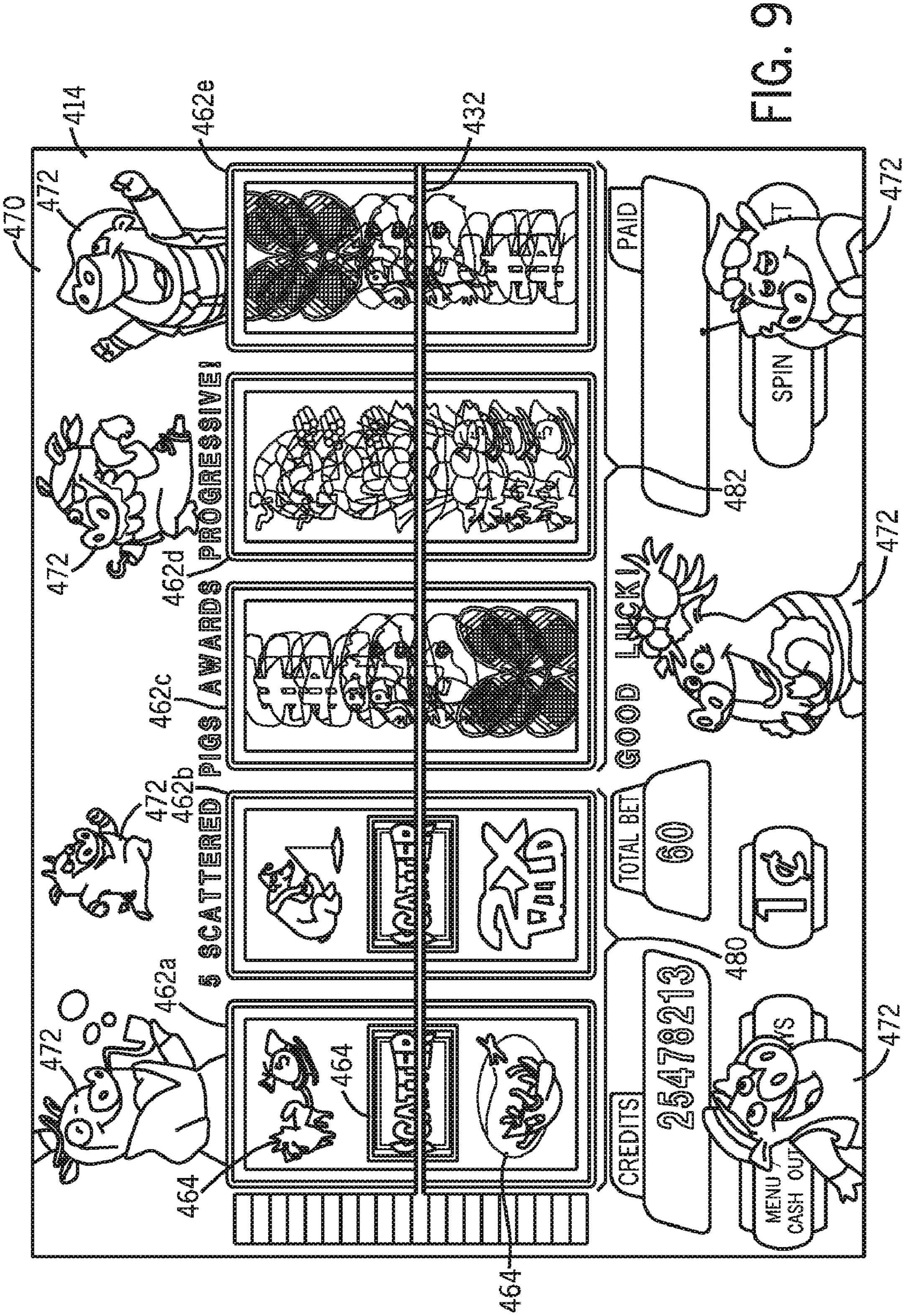
FIG. 9 is a screen shot depicting a play of the community wagering game of FIG. 8.
Figure 10:
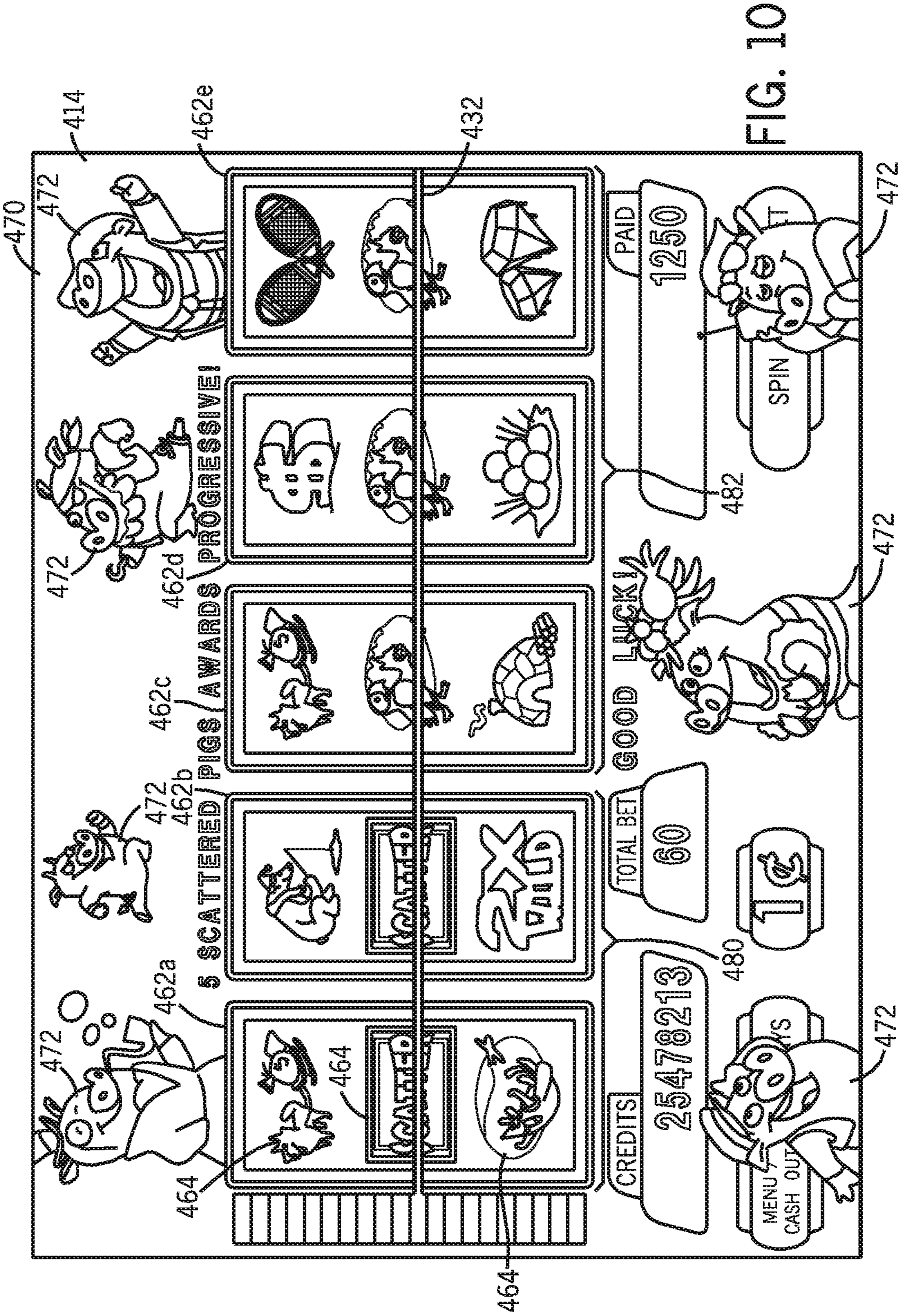
FIG. 10 is a screen shot depicting an outcome of the play of the community wagering game of FIG. 8.

An alternate embodiment of a community wagering game 470 known as the "Pigs Take Over Bonus" is shown in FIGS. 8-10. In FIG. 8, a the wagering game 470 is shown as displayed on the primary display 414. The wagering game 470 is a slot game which includes a plurality of reels 462 which may be either electro mechanical reels or simulations thereof on the primary display 414. The reels 462 include a plurality of symbols 464 displayed thereon which vary as the reels 462 are spun and stopped. The symbols 464 may include any variety of graphical symbols, elements, or representations, including symbols 464 which are associated with one or more themes of the gaming machines. The symbols 464 may also include a blank symbol, or empty space. In an embodiment, the community wagering game 470 is triggered randomly by a controller of the community gaming system. Once triggered, eligible players participate in the community wagering game 470. As can be seen in FIGS. 8-10, the primary display 414 depicts the theme of the "Pigs Take Over Bonus" community wagering game 470. A plurality of animated "pig" characters 472 are depicted running about on the primary display 414, signifying the triggering of the community wagering game 470.

Turning to FIG. 9, the primary display 414 depicts further progression of the community wagering game 470, which in this embodiment, is a free spin game. Thus, each eligible player is awarded a number of free spins of the reels 462 which are evaluated for winning outcomes and combinations of symbols 464. Each player may be awarded the same or differing numbers of free spins. A community controller (not shown) takes control over a first portion, or community portion 480, of the primary wagering game 460, which in this embodiment is the first two reels 462*a,b*. The community controller adjusts the first two reels 462*a,b* to a predetermined position comprising the community portion 480 for all of the gaming machines participating in the community wagering game 470. The predetermined position, or community portion 480, may be randomly determined by the community controller, may be a constant position stored in memory, or may be any other position such that position and displayed symbols 464 on the first two reels 462*a,b* on all participating gaming machines are the same. In this embodiment, the predetermined position results in the community portion 480 comprising two "Scatter" symbols 464 being in the center position on each of the first two reels 462*a,b* as shown in FIG. 9.

Once the community controller selects and sets the position of the first two reels 462*a,b*, the community wagering game 470 continues by progressing through the free spins awarded to each player. In FIG. 9, the remaining three reels 462*c,d,e* are shown spinning and stopping to display a randomly selected outcome comprising an individual portion 482 of the community wagering game 470. The individual portion 482 is selected by a controller associated with the gaming machine 410 and primary display 414. Thus, the last three reels 462*c,d,e* display symbols 464 randomly selected by a controller of the gaming machine 410 associated with the primary display 414. Therefore, each gaming machine 410 participating in the community wagering game 470 will display a series of outcomes or symbol combinations, a portion of which is determined by a community controller (the community portion 480, in this embodiment, the first two reels 462*a,b*) and a portion of which is determined by a controller of the gaming machine 410 (the individual portion 482, in this embodiment, the last three reels 462*c,d,e*).

Therefore, each player of the community wagering game 470 will share the community portion 480 of the outcome, and will obtain his or her own individual portion 482 or component of the outcome, based upon the controller of his or her gaming machine 410. In this way, the players of the community wagering game 470 have a portion of their outcomes in common, and a portion of their outcomes individually determined. Each free spin is then evaluated for winning combinations across active paylines 432, and corresponding awards are awarded to the players. In the embodiment shown, as seen in FIG. 10, a winning combination has been displayed on the primary display 14, comprising the two "Scatter" symbols (which act as wild symbols) generated by the community controller on the first two reels 462*a,b* and three additional "Penguin" symbols generated by the controller of the gaming machine 410 on the last three reels 462*c,d,e*. As a result, the player has achieved a "five penguin" pay on the active payline 432, and has been awarded 1250 credits on this particular play during the series of free spins, as seen in the "Paid" meter on the primary display 414. The community wagering game 470, or certain portions thereof, may be displayed on a community display, the primary display 414, or both. For example, the community first two reels 462*a,b* may be displayed on a community display, while all five reels 462 are displayed on the primary display 414. Other configurations are possible.

Although the community wagering game 470 described in reference to FIGS. 8-10 is a free spin slot game, in alternative embodiments, the community wagering game 470 may take on many other forms. For example, the community wagering game 470 may be a selection game, in which a players select from a field of player selectable icons which reveal various awards. In such an embodiment, the community controller may select one or more icons which are awarded to all players of the community wagering game 470, while the players themselves select other icons which reveal awards which are individually awarded to the players who selected them. In yet other embodiments, the community wagering game 470 may be a card game, a dice game, a symbol game, or any other game in which a first portion of the outcome is a community portion determined by a community controller, and a second portion of the outcome is an individual portion determined by a controller associated with each individual gaming machine 410.

In yet another alternative embodiment, the community wagering game may include a cascading symbols game, in which symbols fall into a matrix or array, and winning combinations of symbols are removed from the array and substituted with additional falling symbols. One such example of a cascading symbol game is described in U.S. Patent Application 2004/0033829 to Pacey et al, entitled "Symbol Matching Gaming Machine" and assigned to WMS Gaming Inc., which is hereby fully incorporated by reference as if fully set forth herein. The community portion of the community wagering game may be the random generation of symbols which are used to fill the array through the cascading mechanism. This portion could be controlled by the community controller as described herein. Meanwhile the individual portion of the community wagering game may be a player modifier, such as a multiplier, individually determined by a controller associated with the gaming device upon which the player is playing. Other configurations are possible.

Figure 11:
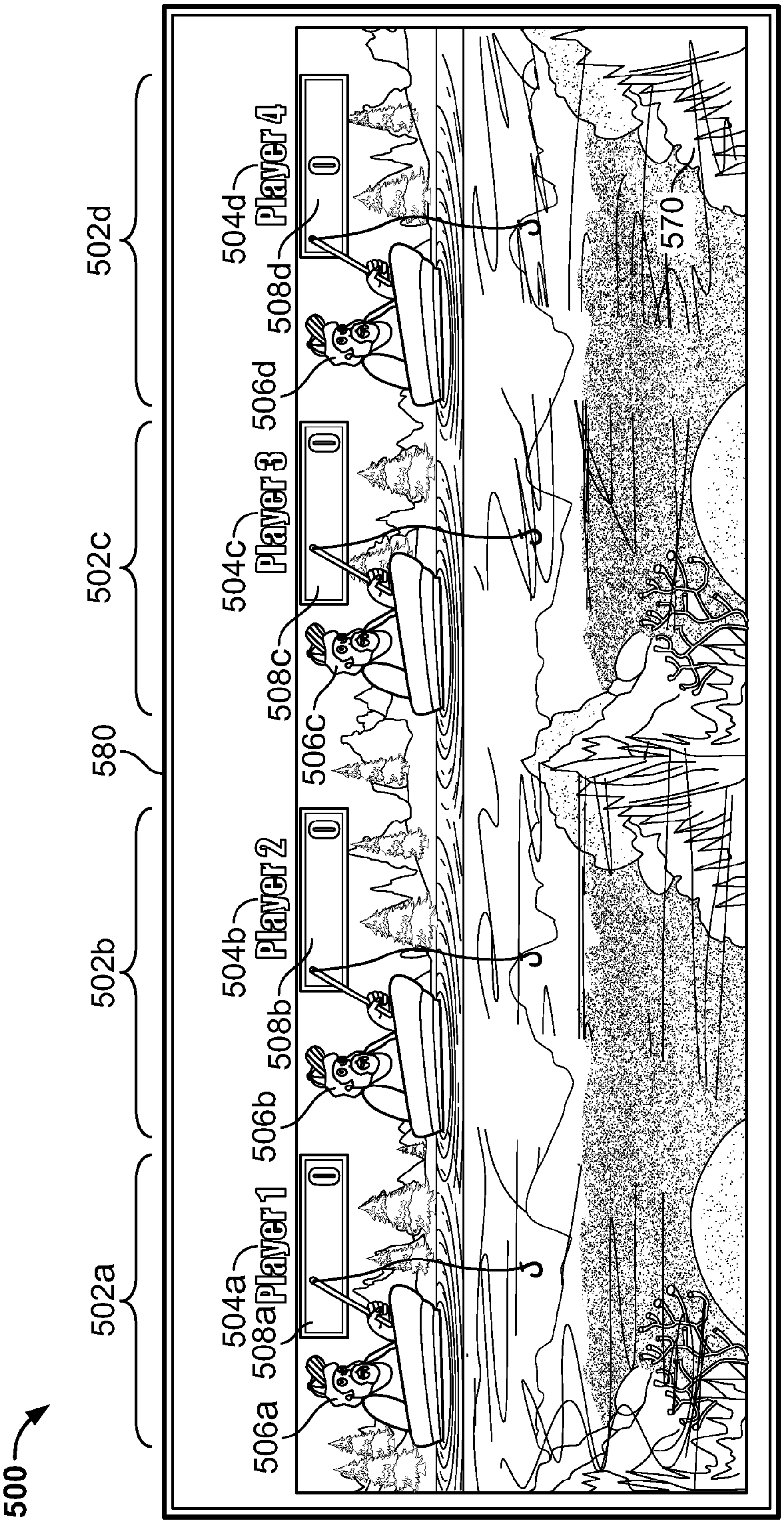
FIG. 11 is a screen shot of an alternative embodiment of a community wagering game featuring a fishing competition.

In FIGS. 11-15, an alternative embodiment of a gaming system 500 including a community wagering game 570 displayed on a community display 580 is shown. FIG. 11 depicts the community display 580 displaying a community wagering game 570 which is a fishing competition game, which includes a competition amongst or between a plurality of players 502*a,b,c,d*. The players 502*a,b,c,d* are graphically represented on the community display 380 by a player label 504*a,b,c,d* as well as a player icon 506*a,b,c,d* or graphic. Proximate the player label 504*a,b,c,d* is a point window 508*a,b,c,d* representing the points earned by each player 502*a,b,c,d* during the community wagering game 570. As seen in FIG. 11, the community wagering game 370 has not yet commenced, and thus the point totals shown in each of the player's point windows 508*a,b,c,d* is zero. In an embodiment, each of the players 502*a,b,c,d* represents a player seated at a gaming device of the system 500, for whom one or more wagers have been received. In other embodiments, some of the players 502*a,b,c,d* may represent actual human players of gaming devices of the system, while other players 502*a,b,c,d* represent avatars, fictitious players, or computer players or opponents. Eligibility of the various players 502*a,b,c,d* to participate in the community wagering game 570 may be evaluated on a number of bases, including time based, point based, credit based, size of wager, accumulation of points or other assets, etc.

Figure 12:
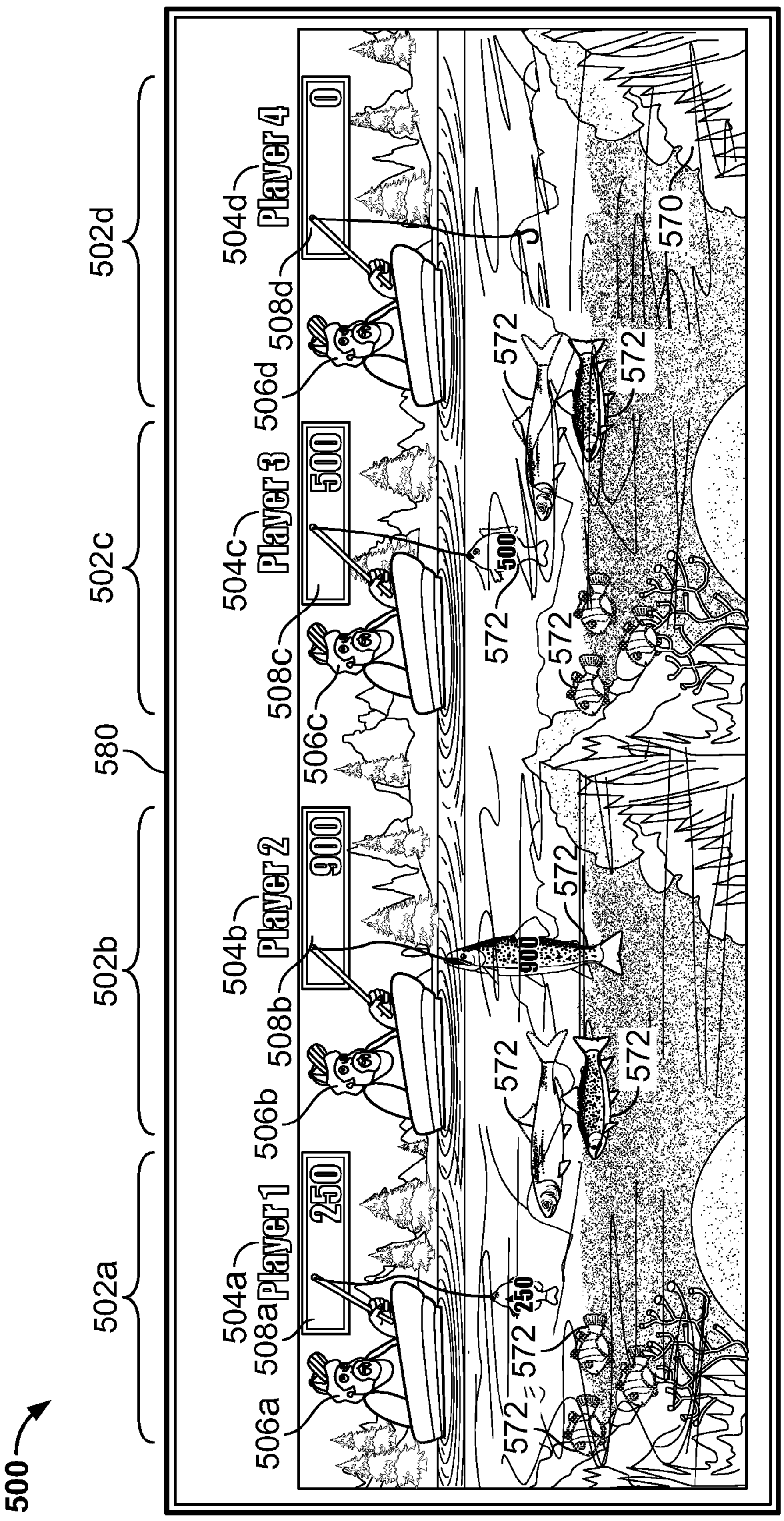
FIG. 12 is a screen shot of the community wagering game of FIG. 11, depicting players participating in the competition.

Turning to FIG. 12, the community wagering game 570 has commenced and the fishing competition is underway. Each player 502*a,b,c,d* participates in the competition by using his or her fishing rod in an effort to catch fish 572 which are swimming in the water below the players 502*a,b,c,d*. One or more of the fish 572 are associated with a point value, or other currency. In the embodiment shown, the size of the point value for a particular fish 572 is associated with a size of the fish 572. Thus, generally, larger fish 572 are associated with larger point values, and smaller fish 572 are associated with smaller point values. A controller (not shown) of the system 500 causes the fish 572 to traverse the water and encounter the hooks of the players 502*a,b,c,d* competing in the community wagering game 560. The controller may cause the fish 572 to move in random patterns, or predetermined patterns, and evaluates whether a "catch" is made based upon certain criteria (for example, how close a fish 572 gets to a player's hook). Once the controller evaluates that a catch has been made, the caught fish 572 is removed from the water and the associated point value for the fish 572 is credited to the point window 508*a,b,c,d* for the player 502*a,b,c,d* catching the fish 572. In an embodiment, when the fish 572 are swimming, their point value is unknown, however when a fish 572 is caught (as seen in FIG. 12), the associated point value is revealed.

Figure 13:
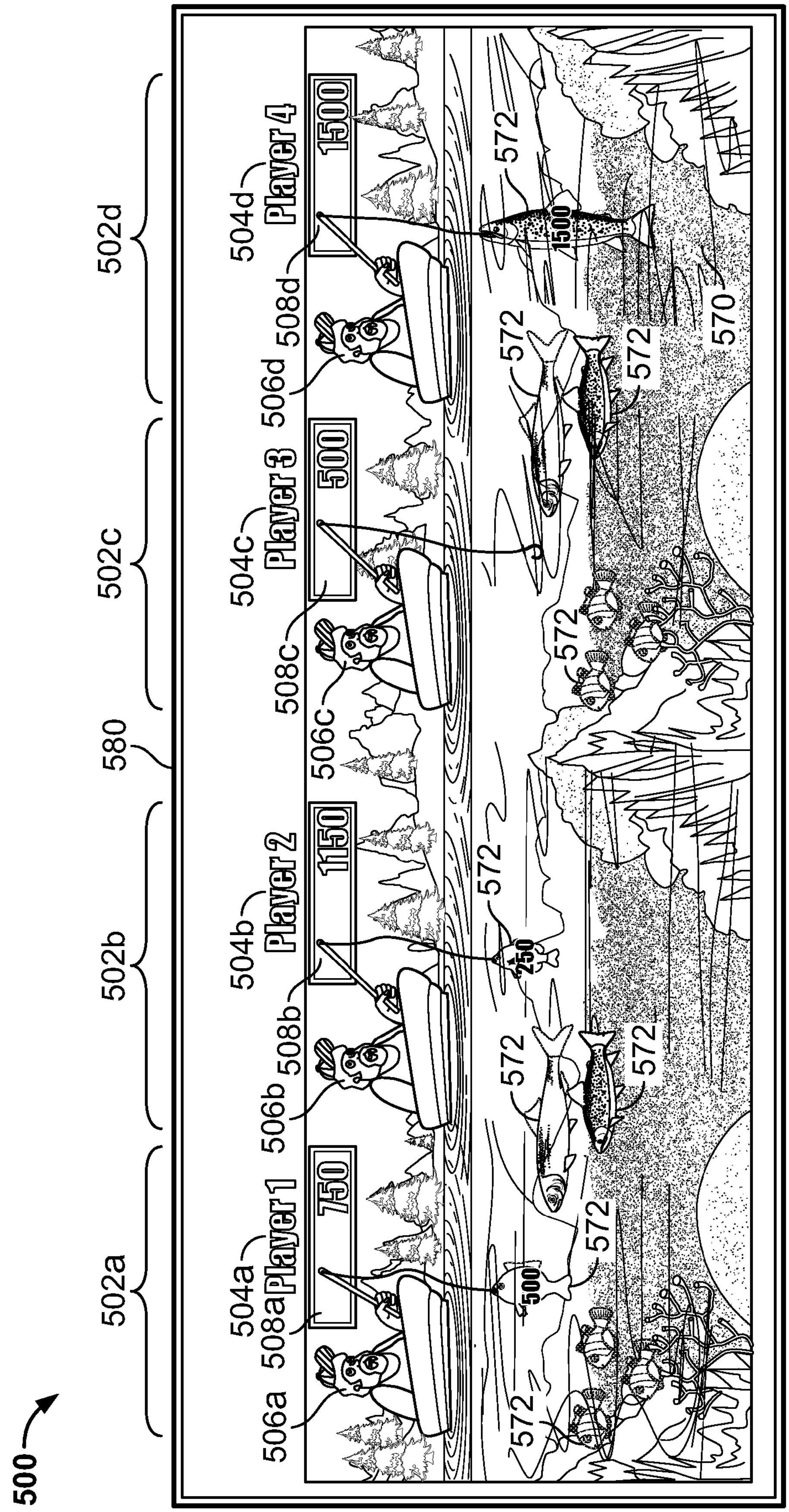
FIG. 13 is a further screen shot of the competition of FIG. 12.
Figure 14:
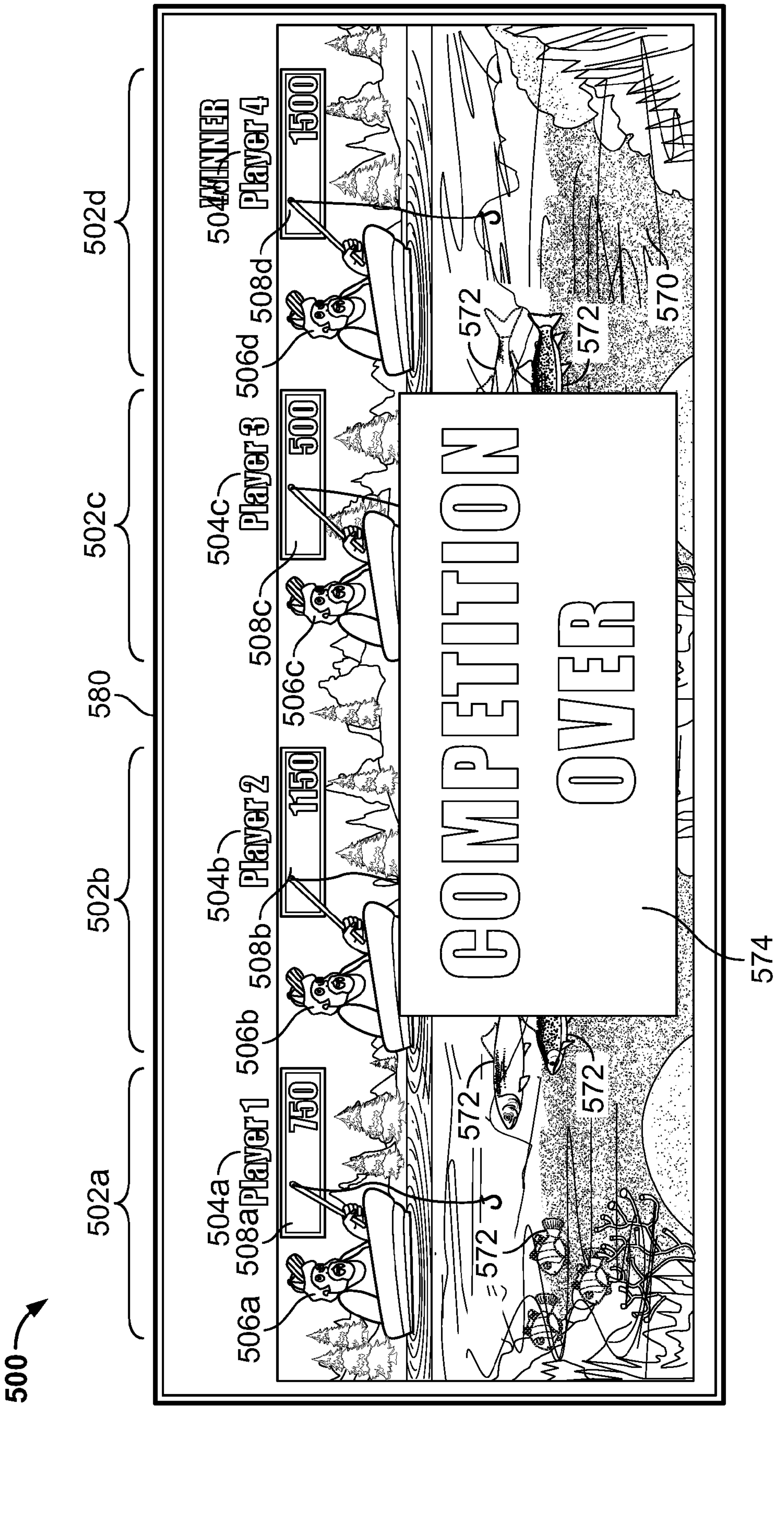
FIG. 14 is a further screen shot of the competition of FIG. 12, showing a conclusion of the competition.

Turning to FIG. 13, a further screen shot of the community wagering game 570 is displayed on the community display 580. The players 502*a,b,c,d* continue to compete in the fishing competition in an effort to "catch" more fish 572 to achieve greater point totals in their respective point windows 508*a,b,c,d*. Upon the occurrence of a triggering event, the fishing competition is terminated and a pop up message 574 announces to the players 502*a,b,c,d* "Competition Over," as seen in FIG. 14. This concludes the community wagering game 380 and the fishing competition is declared over. Each of the player's 502*a,b,c,d* respective total point totals is displayed in the point windows 508*a,b,c,d* associated with such player 502*a,b,c,d*. The community display 380 may further announce a "Winner" who is the player 502*a,b,c,d* with the highest point total in their point window 508*a,b,c,d*. As seen in FIG. 14, Player Four 502*d* has won the fishing competition with a point total of 1500 points displayed in his point window 508*d*.

Figure 15:
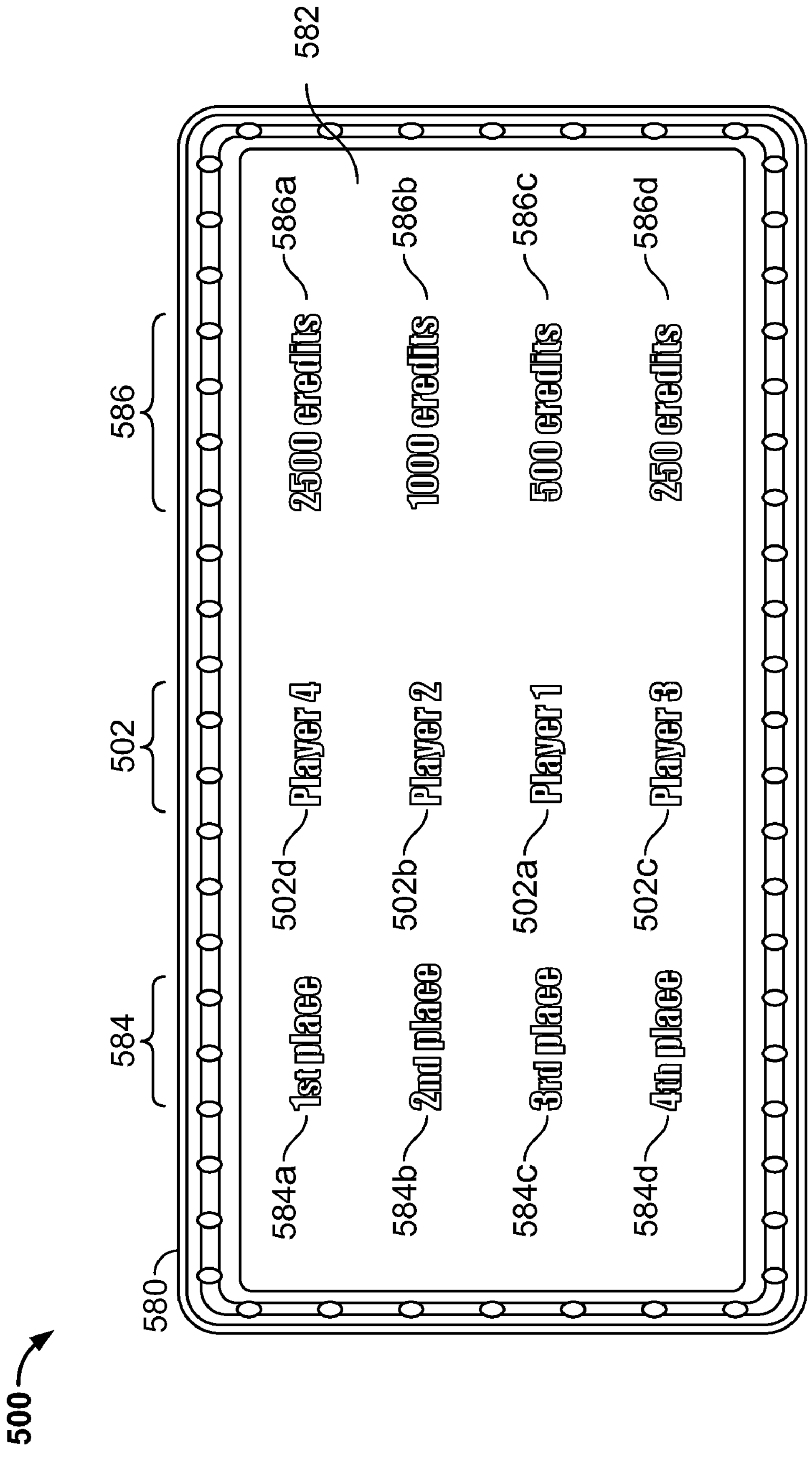
FIG. 15 is a screen shot showing the results of the competition of FIG. 12, and the awards associated therewith.

Turning to FIG. 15, a results window 582 is displayed on the community display 580. The results window 582 includes a listing of finishing order, or ranking 584, a listing of the players 502*a,b,c,d* in the order in which they finished, and a listing of a respective award 586*a,b,c,d* provided to each player 502. The awards 586*a,b,c,d* are provided to the players 502*a,b,c,d* based upon their finishing order 584. Thus, four awards 586*a,b,c,d* are associated in order with the four finishing order 584*a,b,c,d* positions, and are unaffected by the point totals earned by each player during play of the community wagering game 370. In the embodiment shown, Player Four 502*d* has finished in first place 584*a*, and thus receives the first prize 586*a* of 2500 credits. Player Two has finished in second place 584*b*, and thus receives the second prize 586*b* of 1000 credits. Player One has finished in third place 584*c*, and thus receives the third prize 586*c* of 500 credits. Player Three has finished in fourth place 584*d*, and thus receives the fourth prize 586*d* of 250 credits. Thus, as seen in the FIGURES, the player's point totals accumulated during play of the community wagering game 570 is used to determine a finishing order 584, and the awards 586 player's are provided are also based upon the finishing order 584. Thus, in an embodiment, the awards 586 provided to the players 502 are independent of the point total accumulated during play.

In alternative embodiments, the community wagering game 570 may take on a variety of forms of competitions, races, sporting events, trivia contests, etc. in which players compete. Moreover, various portions of the community wagering game 370 may be displayed on a community display 580, or on the primary displays of various gaming devices of the system 500, or even on other remote and/or ancillary displays. In still other alternative embodiments, the players in the competition may be evaluated based upon other criteria in addition to, or instead of, accumulation of points. For example, players may be evaluated based upon speed, accuracy, skill, longevity, strength, or other criteria in the community wagering game 370. Upon conclusion of the community wagering game 370, the evaluation of the players on these bases will result in a finishing order in the competition, to which various awards will be assigned. The awards assigned to the various placements in the finishing orders may be predetermined, player selected, or randomly assigned. Other variations exist.

The gaming system of the present invention offers a number of benefits to players of the wagering game. The nature of the community wagering game adds to players' excitement and interest through interaction, socialization, camaraderie, and common interest. Moreover, the community wagering game preserves an individual component of the wagering game outcomes as it permits players who wager higher amounts, and player faster, to retain a higher more effective modifier and have that modifier applied to the outcome of the community wagering game. The competitive nature of the community wagering game ensures high levels of entertainment and interaction as the competition is displayed. In this way, the community wagering game provides the best of both worlds by offering an effective community environment for players while preserving an individual component of the wagering game.

Each of these embodiments and obvious variations thereof is contemplated as falling within the spirit and scope of the claimed invention, which is set forth in the following claims.

What is claimed is:

1. A method for conducting a community wagering game on a gaming system with one or more gaming devices, the method comprising:

receiving, via an input device, an indication of a first wager from a first player to play a first base game of a wagering game;

determining, via a controller, a first community-event-prize modifier associated with the first player based upon play of the first base game;

triggering and displaying, via a display device, a community gaming event comprising a competition;

determining a finishing order of a plurality of participants in the competition, the plurality of participants including at least first and second participants;

associating the first player with the first participant;

determining a first community-event prize value for the first participant, the first community-event prize value being based upon the finishing order; and awarding the first player a first community-event award comprising the first community-event prize value as modified by the first community-event-prize modifier, the first community-event award being different from the first community-event prize value.

2. The method of claim 1, further comprising:

receiving an indication of a second wager from a second player to play a second base game;

determining a second community-event-prize modifier associated with the second player based upon play of the second base game;

associating the second player with the second participant;

determining a second community-event prize value for the second participant, the second community-event prize value being based upon the finishing order; and awarding the second player a second community-event award comprising the second community-event prize value as modified by the second community-event-prize modifier.

3. The method of claim 2, wherein the first and second community-event-prize modifiers are multipliers.

4. The method of claim 1, wherein the competition is selected from the group consisting of a race, a contest, and a sporting event.

5. The method of claim 1, wherein the first community-event-prize modifier is a multiplier of the first community-event prize value of the community gaming event.

6. The method of claim 1, wherein at least a portion of the community gaming event is displayed on a community display.

7. The method of claim 1, wherein the first community-event-prize modifier is determined based upon one or more of a wager amount, a rate of wagering by the first player, and a rate of play of the first base game.

8. The method of claim 1, wherein each of the plurality of participants is represented by a graphical icon associated with a theme of the community wagering game.

9. The method of claim 1, wherein the finishing order of the community gaming event is randomly determined.

10. The method of claim 1, wherein the finishing order of the community gaming event is predetermined and an outcome of the first base game is randomly determined.

11. The method of claim 1, wherein the first base game includes a plurality of symbols arranged in an array, and wherein the community gaming event does not include the plurality of symbols of the first base game.

12. The method of claim 11, wherein the plurality of symbols are arranged on a plurality of reels.

13. The method of claim 1, wherein the indication is of a plurality of wagers from the first player to play a plurality of successive plays of the first base game, and wherein determining the first community-event-prize modifier is based upon game play activity of the first player during the plurality of successive plays.

14. A computer program product comprising one or more non-transitory computer-readable storage media encoded with instructions, the instructions being configured to cause, upon execution by one or more controllers, a gaming system to perform the acts of:

receiving an indication of a first wager from a first player to play a first base game of a wagering game;

determining a first community-event-prize modifier associated with the first player based upon play of the first base game;

triggering and directing a display device to display a community gaming event comprising a competition;

determining a finishing order of a plurality of participants in the competition, the plurality of participants including at least first and second participants;

associating the first player with the first participant;

determining a first community-event prize value for the first participant, the first community-event prize value being based upon the finishing order; and awarding the first player a first community-event award comprising the first community-event prize value as modified by the first community-event-prize modifier, the first community-event award being different from the first community-event prize value.

15. The computer program product of claim 14, wherein the indication is of a plurality of wagers from the first player to play a plurality of successive plays of the first base game, and wherein determining the first community-event-prize modifier is based upon game play activity of the first player during the plurality of successive plays.

16. A community gaming system for playing a community wagering game, the community gaming system comprising:

a wager input device;

a plurality of gaming terminals including at least first and second gaming terminals each with a respective display for displaying a randomly selected outcome of a wagering game; and a community controller operatively connected to the plurality of gaming terminals such that each of the plurality of gaming terminals can play the community wagering game, the community controller being operable to:

determine a first community-event-prize modifier associated with a first player based upon play of a first base game by the first player at the first gaming terminal;

in response to a triggering event, command a display to display a community gaming event comprising a competition with a plurality of participants, the plurality of participants including at least first and second participants;

determine a finishing order of the plurality of participants in the competition;

associate the first player with the first participant;

determine a first community-event prize value for the first participant, the first community-event prize value being based upon the finishing order; and award the first player a first community-event award comprising the first community-event prize value modified by the first community-event-prize modifier, the first community-event award being different from the first community-event prize value.

17. The community gaming system of claim 16, wherein the controller is further operable to:

determine a second community-event-prize modifier associated with a second player based upon play of a second base game by the second player at the second gaming terminal;

associate the second player with the second participant;

determine a second community-event prize value for the second participant, the second community-event prize value being based upon the finishing order; and award the second player a second community-event award comprising the second community-event prize value as modified by the second community-event-prize modifier.

18. The community gaming system of claim 16, wherein the controller is further operable to determine if the first player is eligible to participate in the community wagering game, and wherein the associating the first player with the first participant is in response to the controller determining the first player is eligible to participate in the community wagering game.

19. The community gaming system of claim 18, wherein the eligibility of the first player to participate in the community wagering game decrements with time and replenishes with play of the wagering game.

20. The community gaming system of claim 16, wherein the play of the first base game upon which the first community-event-prize modifier is determined includes at least one of an amount of a wager placed by the first player and a rate of play of the first player.

21. A method for conducting a community wagering game on a gaming system, the method comprising:

receiving, via one or more input devices, inputs indicative of a plurality of wagers from a first player to play a plurality of successive plays of a first base game;

determining, via one or more controllers, a first community-event-prize modifier associated with the first player based upon game play activity of the first player during the plurality of successive plays;

displaying, via one or more display devices, a community gaming event comprising a competition with a plurality of participants;

determining a finishing order of the plurality of participants in the competition;

associating the first player with a first one of the plurality of participants;

determining a first community-event prize value for the first participant, the first community-event prize value being based upon the finishing order; and awarding the first player a first community-event award comprising the first community-event prize value increased by the first community-event-prize modifier.

* * * * *